US011418991B2

(12) United States Patent
Hosseini et al.

(10) Patent No.: US 11,418,991 B2
(45) Date of Patent: Aug. 16, 2022

(54) TECHNIQUES FOR DATA RATE SHARING FOR UPLINK AND SIDELINK WIRELESS COMMUNICATIONS

(71) Applicant: QUALCOMM Incorporated, San Diego, CA (US)

(72) Inventors: Seyedkianoush Hosseini, San Diego, CA (US); Peter Gaal, San Diego, CA (US); Gabi Sarkis, San Diego, CA (US); Gokul Sridharan, Sunnyvale, CA (US); Chih-Ping Li, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/069,541

(22) Filed: Oct. 13, 2020

(65) Prior Publication Data

US 2021/0112553 A1 Apr. 15, 2021

(30) Foreign Application Priority Data

Oct. 14, 2019 (GR) .............................. 20190100456

(51) Int. Cl.
*H04W 28/02* (2009.01)
*H04W 72/04* (2009.01)
*H04W 24/08* (2009.01)
*H04W 72/14* (2009.01)
*H04L 5/00* (2006.01)

(52) U.S. Cl.
CPC ............. *H04W 28/02* (2013.01); *H04L 5/001* (2013.01); *H04W 24/08* (2013.01); *H04W 72/0453* (2013.01); *H04W 72/14* (2013.01)

(58) Field of Classification Search
CPC . H04W 72/0453; H04W 72/14; H04W 28/02; H04W 24/08; H04L 5/001
See application file for complete search history.

(56) References Cited

U.S. PATENT DOCUMENTS

2017/0126306 A1 5/2017 Kim et al.
2018/0054237 A1 2/2018 Tseng et al.

OTHER PUBLICATIONS

International Search Report and Written Opinion—PCT/US2020/055588—ISA/EPO—dated Jan. 14, 2021.

*Primary Examiner* — Kevin C. Harper
(74) *Attorney, Agent, or Firm* — ArentFox Schiff LLP

(57) ABSTRACT

Some aspects described herein relate to considering data rates of multiple interfaces in determining whether to decode communications received over the interfaces and/or to considering the multiple interfaces in determining parameters for granting resources for one or more of the interfaces.

30 Claims, 7 Drawing Sheets

TECHNIQUES FOR DATA RATE SHARING FOR UPLINK AND SIDELINK WIRELESS COMMUNICATIONS

CLAIM OF PRIORITY UNDER 35 U.S.C. § 119

The present application for patent claims priority to Greek Patent Application No. 20190100456, entitled "TECHNIQUES FOR DATA RATE SHARING FOR UPLINK AND SIDELINK WIRELESS COMMUNICATIONS" filed Oct. 14, 2019, which is assigned to the assignee hereof and hereby expressly incorporated by reference herein for all purposes.

BACKGROUND

Aspects of the present disclosure relate generally to wireless communication systems, and more particularly, to communicating using multiple different interfaces.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) may communicate over multiple interfaces. The multiple interfaces may include a Uu interface between the UE and a base station, where the UE can receive communications from the base station over a downlink and transmit communications to the base station over an uplink. In addition, the multiple interfaces may include a sidelink interface where the UE can communicate with one or more other UEs directly over a sidelink channel (e.g., without traversing the base station).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving, from an access point, downlink communications over a set of downlink resources, receiving, from a user equipment (UE), sidelink communications over a set of sidelink resources that overlap the set of downlink resources at least in a time domain, determining whether the downlink communications and the sidelink communications comply with a threshold data rate, determining, based on the determining whether the downlink communications and the sidelink communications comply with a threshold data rate, whether to decode at least one of the downlink communications or the sidelink communications, and decoding, based on determining to decode, the at least one of the downlink communications or the sidelink communications.

In another example, a method of wireless communication is provided that includes receiving, for a UE, a threshold data rate supported by the UE, determining, for the UE, a set of sidelink resources configured for receiving sidelink communications from one or more other UEs, determining, for the UE, a set of downlink resources configured for receiving downlink communications, determining, based on the threshold data rate, one or more downlink parameters for transmitting downlink communications to the UE, and transmitting, to the UE and based on the one or more downlink parameters, at least a downlink resource grant indicating the set of downlink resources.

In another example, a method for wireless communication is provided that includes determining whether uplink communications and sidelink communications comply with a threshold data rate, determining, based on the determining whether the uplink communications and the sidelink communications comply with a threshold data rate, whether to transmit at least one of the uplink communications or the sidelink communications, and transmitting, based on determining to transmit, the at least one of the uplink communications or the sidelink communications.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

In yet another example, an apparatus for wireless communication is provided that includes a transceiver, a memory configured to store instructions, and one or more processors communicatively coupled with the transceiver and the memory. The one or more processors are configured to determine, based on determining whether uplink communications and sidelink communications comply with a threshold data rate, whether to transmit at least one of the uplink communications or the sidelink communications, and transmit, based on determining to transmit, the at least one of the uplink communications or the sidelink communications To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
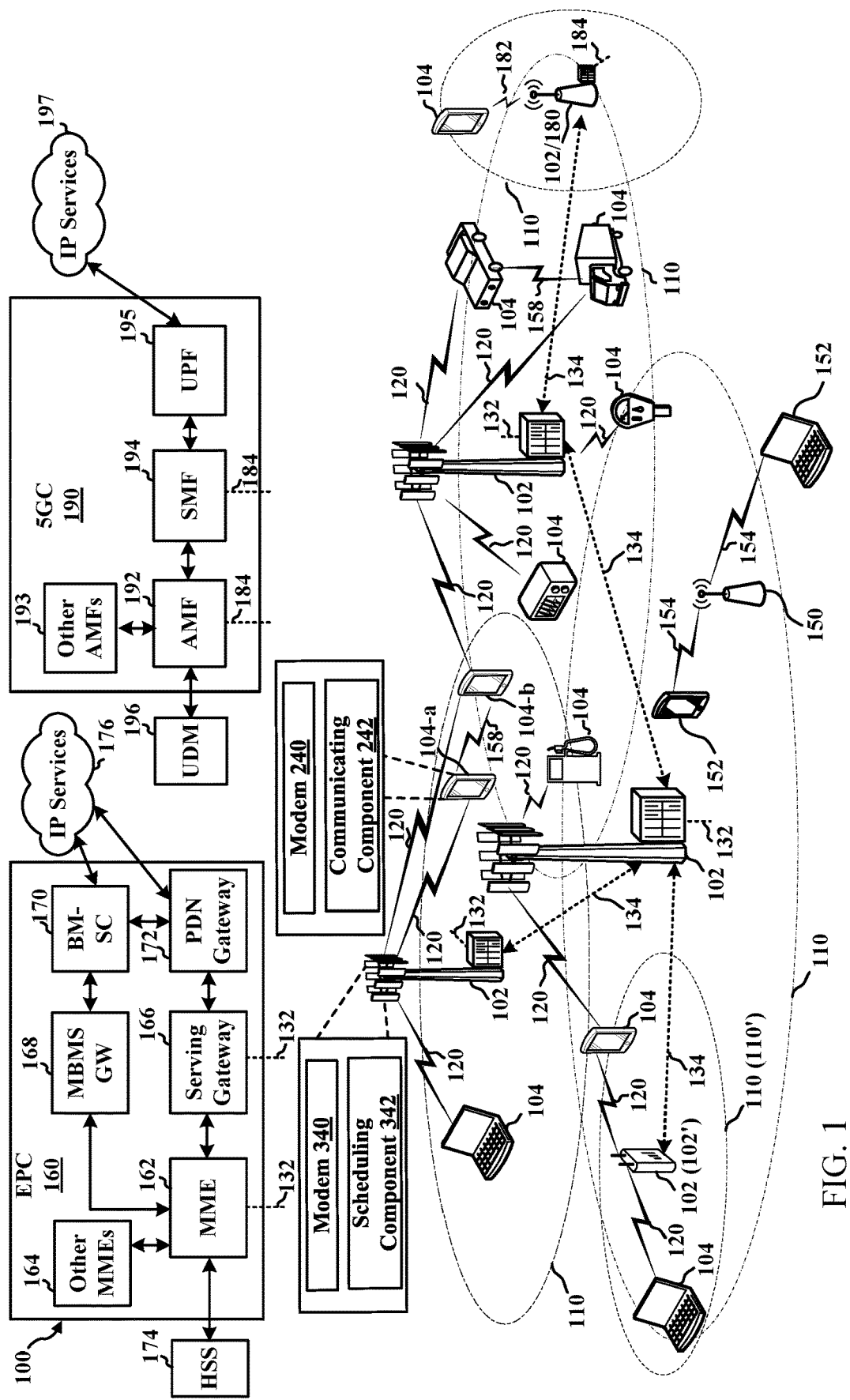
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to enabling data sharing among multiple interfaces in wireless communications. For example, a user equipment (UE) can communicate using multiple interfaces, which may include communications over a Uu interface (e.g., over an uplink and/or downlink channel with a base station), communications over a sidelink interface (e.g., over a sidelink channel with one or more other UEs), etc. In addition, the UE can determine a data rate for communications in determining whether to decode downlink communications and/or whether to encode or transmit uplink communications, and may refrain from decoding and/or encoding/transmitting where a data rate of the communications exceeds a threshold data rate. Where the UE concurrently communicates over the multiple interfaces, it may consider or otherwise measure the data rate for the multiple interfaces in determining whether to decode and/or encode/transmit communications over the interfaces.

In one example, the UE can consider a total data rate for both (or all) interfaces, and can compare the total data rate of communications that are concurrently received, or are concurrently encoded/transmitted, to the threshold in determining whether to decode or encode/transmit the communications. In an example, the interfaces may correspond to the same or different network operator or public land mobile network (PLMN), the same or different cell or corresponding access point (e.g., gNB), etc. In addition, the interfaces may be over different component carriers (CCs), using different bandwidth parts (BWPs) or other portions of bandwidth, etc.

In an example, an access point can consider the multiple interfaces configured at the UE in determining a data rate for one or more interfaces provided by (or configured by) the access point. For example, the access point can determine a data rate for a Uu interface (e.g., for downlink communications transmitted on the Uu interface or for resources or other parameters configured for uplink communications by the UE on the Uu interface) based at least in part on known or determined data rate parameters for another interface. For example, the other interface can include a sidelink interface, and the data rate parameters for the sidelink interface can be configured by the access point related to the Uu interface or by another access point or by the UE or one or more other UEs.

In a specific example, in third generation partnership project (3GPP) new radio (NR), as specified in Technical Specification (TS) 38.214 v.15.7.0 section 5.1.3, within a cell group, a UE may not be required to handle physical downlink shared channel(s) (PDSCH(s)) transmissions in slot $s_j$ in serving cell-j, and for j=0, 1, 2 . . . J-1, slot $s_j$ overlapping with any given point in time, if the following condition is not satisfied at that point in time:

$$\sum_{j=0}^{J-1} \frac{\sum_{m=0}^{M-1} V_{j,m}}{T_{slot}^{\mu(j)}} \leq DataRate$$

where, J is the number of configured serving cells belonging to a frequency range for the j-th serving cell, M is the number of transport block(s) (TB) transmitted in slot $s_j$. $T_{slot}^{\mu(j)}=10^{-3}/2^{\mu(j)}$, where $\mu(j)$ is the numerology for PDSCH(s) in slot $s_j$ of the j-th serving cell, for the m-th TB, $$V_{j,m} = C' \cdot \left\lceil \frac{A}{C} \right\rceil,$$

A is the number of bits in the transport block, C is the total number of code blocks for the transport block, C' is the number of scheduled code blocks for the transport block, and DataRate [Mbps] is computed as the maximum data rate summed over all the carriers in the frequency range for any signaled band combination and feature set consistent with the configured servings cells. In this example, a slot can be a unit of time resources defined by a collection of symbols (e.g., orthogonal frequency division multiplexing (OFDM) symbols).

Similarly, in TS 38.214 v.15.7.0 section 6.1.4, for a j-th serving cell, if higher layer parameter processingType2Enabled of PDSCH-ServingCellConfig is configured for the serving cell and set to enable, or if at least one $I_{MCS}$>W for a PDSCH, where W=28 for MCS tables 5.1.3.1-1 and 5.1.3.1-3, and W=27 for MCS table 5.1.3.1-2, the UE is not required to (and may refrain from) handling PDSCH transmissions, if the following condition is not satisfied:

$$\frac{\sum_{m=0}^{M-1} V_{j,m}}{L \times T_s^\mu} \leq DataRateCC$$

where L is the number of symbols assigned to the PDSCH, M is the number of TB(s) in the PDSCH, $$T_s^\mu = \frac{10^{-3}}{2\mu \cdot N_{symb}^{slot}}$$

where μ is the numerology of the PDSCH, for the m-th TB, $$V_{j,m} = C' \cdot \left\lfloor \frac{A}{C} \right\rfloor,$$

A is the number of bits in the transport block, C is the total number of code blocks for the transport block, C' is the number of scheduled code blocks for the transport block, and DataRateCC [Mbps] is computed as the maximum data rate for a carrier in the frequency band of the serving cell for any signaled band combination and feature set consistent with the serving cell, where the data rate value is given by the formula below and including the scaling factor f(i).

Similarly, for uplink communications, in TS 38.214 v.15.7.0 section 6.1.4, within a cell group, a UE is not required to handle physical uplink shared channel(s) (PUSCH(s)) transmissions in slot $s_j$ in serving cell-j, and for j=0, 1, 2 . . . J−1, slot $s_j$ overlapping with any given point in time, if the following condition is not satisfied at that point in time:

$$\sum_{j=0}^{J-1} \frac{\sum_{m=0}^{M-1} V_{j,m}}{T_{slot}^{\mu(j)}} \leq DataRate,$$

where J is the number of configured serving cells belong to a frequency range, for the j-th serving cell, M is the number of TB(s) transmitted in slot-$s_j$, $T_{slot}^{\mu(j)}=10^{-3}/2^{\mu(j)}$, where μ(j) is the numerology for PUSCH(s) in slot $s_j$ of the j-th serving cell, for the m-th TB, $$V_{j,m} = C' \cdot \left\lfloor \frac{A}{C} \right\rfloor,$$

A is the number of bits in the transport block as defined, C is the total number of code blocks for the transport block, C' is the number of scheduled code blocks for the transport block, and DataRate [Mbps] is computed as the maximum data rate summed over all the carriers in the frequency range for any signaled band combination and feature set consistent with the configured servings cells, where the data rate value is given by the formula in Subclause 4.1.2 in TS 38.306, including the scaling factor f(i).

For example, the data rate value can be given by the formula, as specified in TS 38.306 v15.7.0 section 4.1.2:

$$\text{data rate (in } Mbps) = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

where J is the number of aggregated component carriers in a band or band combination, $R_{max}$=948/1024, for the j-th CC, $v_{Layers}^{(j)}$ is the maximum number of supported layers given by higher layer parameter maxNumberMIMO-LayersPDSCH for downlink and maximum of higher layer parameters maxNumberMIMO-LayersCB-PUSCH and maxNumberMIMO-LayersNonCB-PUSCH for uplink, $Q_m^{(j)}$ is the maximum supported modulation order given by higher layer parameter supportedModulationOrderDL for downlink and higher layer parameter supportedModulationOrderUL for uplink, $f^{(j)}$ is the scaling factor given by higher layer parameter scalingFactor and can take the values 1, 0.8, 0.75, and 0.4, μ is the numerology, $T_s^\mu$ the average OFDM symbol duration in a subframe for numerology μ, i.e.

$$T_s^\mu = \frac{10^{-3}}{14 \cdot 2^\mu}$$

(note that normal cyclic prefix can be assumed), $N_{PRB}^{BW(j),\mu}$ is the maximum resource block (RB) allocation in bandwidth $BW^{(j)}$ with numerology μ, where $BW^{(j)}$ is the UE supported maximum bandwidth in the given band or band combination, and $OH^{(j)}$ is the overhead and takes the following values 0.14, for frequency range FR1 for downlink (DL), 0.18, for frequency range FR2 for DL, 0.08, for frequency range FR1 for uplink (UL), 0.10, for frequency range FR2 for UL.

In addition, in an example, the value of f can be rearranged across different cells of the same physical uplink control channel (PUCCH) group (except when it is set to 1 or if timing capability #2 is configured). This enables data sharing across different cells, e.g., the sum throughout is still below the UE capability, but the per CC data rate can change. As referred to herein, processing capability #1 and processing capability #2 for downlink can be as defined in TS 38.214 v15.7.0, section 5.3, which may include a processing time for processing downlink communications based on different capabilities, and processing capability #1 and processing capability #2 for uplink can be as defined in TS 38.214 v15.7.0, section 6.4, which may include a processing time for processing uplink communications based on different capabilities. In either case, the timing capability may be configured or otherwise specified, such that a UE and/or base station can determine the timing capability, and may make other determinations based at least in part on the timing capability, as described further herein.

Aspects described herein relate to using data sharing among interfaces (e.g., among Uu and sidelink interface) where the UE can concurrently communicate over the interfaces. In addition, aspects described herein relate to an access point (e.g., gNB) performing operations in an attempt to guarantee that the maximum data rate condition at the UE is not violated by the data sharing. Various scenarios are considered and explained herein, such as (1) where the interfaces have the same operator/PLMN and the same cell/gNB, (2) where the interfaces have the same operator/PLMN and a different cell/gNB, (3-1) where the interfaces have different operators/PLMN and the UE is configured to transmit in one band of the first operator and to receive in a different band of another operator or an unlicensed band such as intelligent transportation system (ITS) for vehicle-to-anything (V2X), etc., or (3-2) where the interfaces have different operators/PLMN and the UE is configured for transmitting/receiving on one interface in a different band than configured for another interface (e.g., configured for transmitting/receiving on a sidelink that is not in the band of the operator controlling Uu, which may be a band of another operator or in an unlicensed band such as ITS for V2X). Also, multiple resource allocation modes are considered and explained herein, such as mode 1 where the access point (e.g., gNB) can schedule the resources for sidelink transmission or configure the resources for SL transmission (and the UE can determine when to use the configured resources), or mode 2 where the UE determines resources based on sensing, measurement, reservation, etc. of the resources for transmission on the sidelink (e.g., using listen-before-talk or other clear channel assessment functions).

The various scenarios and resource allocation modes may result in the access point using different functions for determining data rate for one or more interfaces. In any case, for receiving communications, the UE can determine the data rate as the total for concurrent interfaces, which may include considering multiple CCs, BWPs, etc. for each interface over which communications are concurrently received from the access point (e.g., over a Uu interface), from one or more UEs (e.g., over a sidelink interface), etc. The UE can accordingly determine whether to decode the communications based on whether the concurrently received communications are complicit with the threshold data rate. Similarly, for transmitting communications, the UE can determine the data rate as the total for concurrent interfaces, which may include considering multiple CCs, BWPs, etc. for each interface over which communications are to be concurrently transmitted to the access point (e.g., over a Uu interface), and to one or more UEs (e.g., over a sidelink interface), etc. The UE can accordingly determine whether to encode and/or transmit the communications based on whether the concurrently transmitted communications are scheduled to be complicit with the threshold data rate.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for decoding communications received over one or more interfaces, encoding/transmitting communications over the one or more interfaces, etc. In addition, some nodes may have a modem 340 and scheduling component 342 for configuring communication resources for UEs over one or more interfaces, as described herein. Though a UE 104 is shown as having the modem 240 and communicating component 242 and a base station 102 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of UE 104-a (and/or other UEs) can receive communications over one or more interfaces, such as a Uu interface from one or more base station 102 and a sidelink interface from one or more UEs (e.g., UE 104-b). Communicating component 242, for example, can determine whether concurrently received communications comply with a threshold data rate at the UE 104-a. In addition, for example, scheduling component 342 can attempt to transmit communications to the UE 104-a that comply with the threshold data rate along with any other communications the UE 104-a may be receiving from other devices (e.g., over a sidelink from one or more other UEs, over the Uu interface from one or more other base stations 102, and/or the like).

Figure 2:
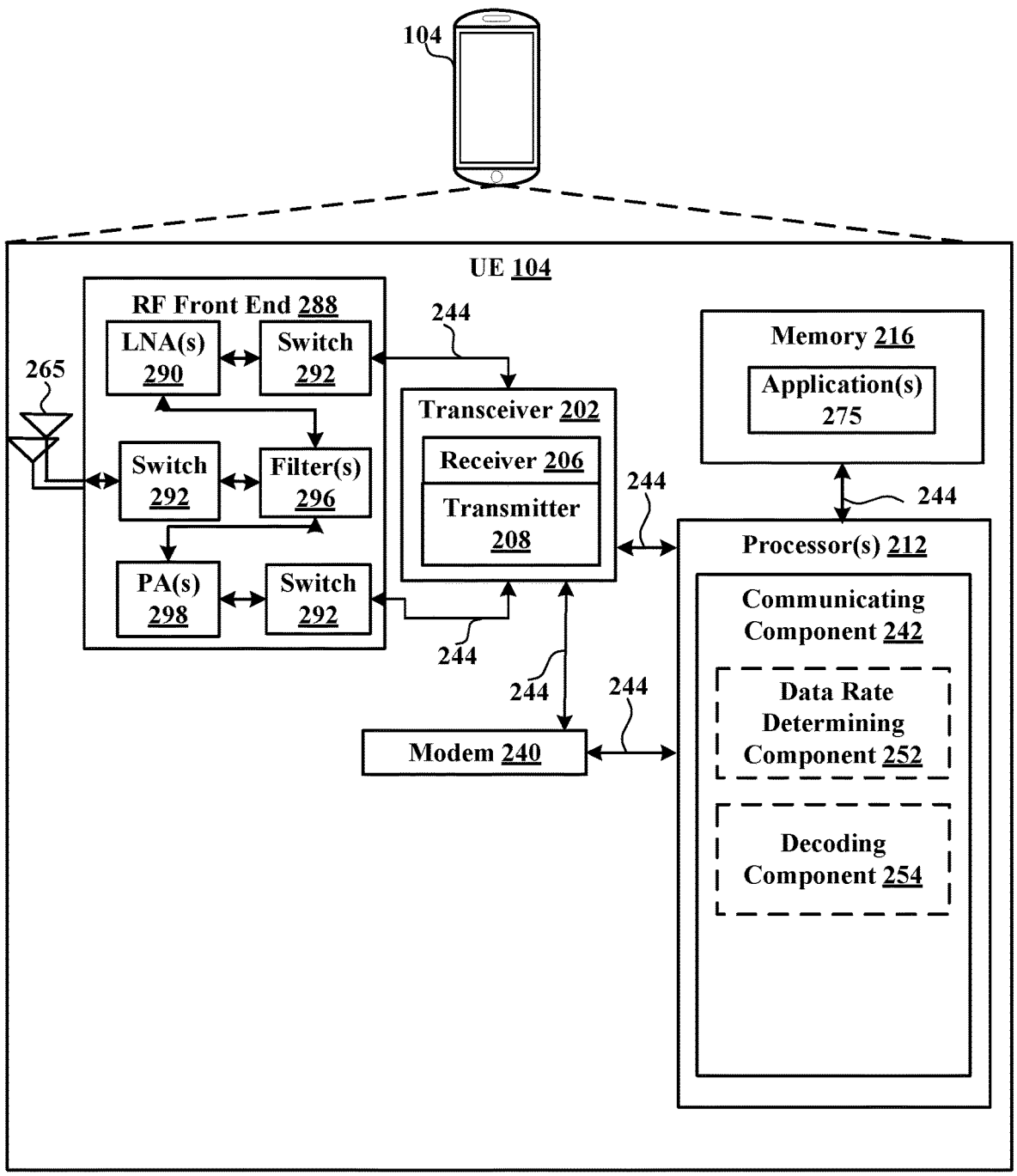
FIG. 2 is a block diagram illustrating an example of a UE, in accordance with various aspects of the present disclosure.
Figure 3:
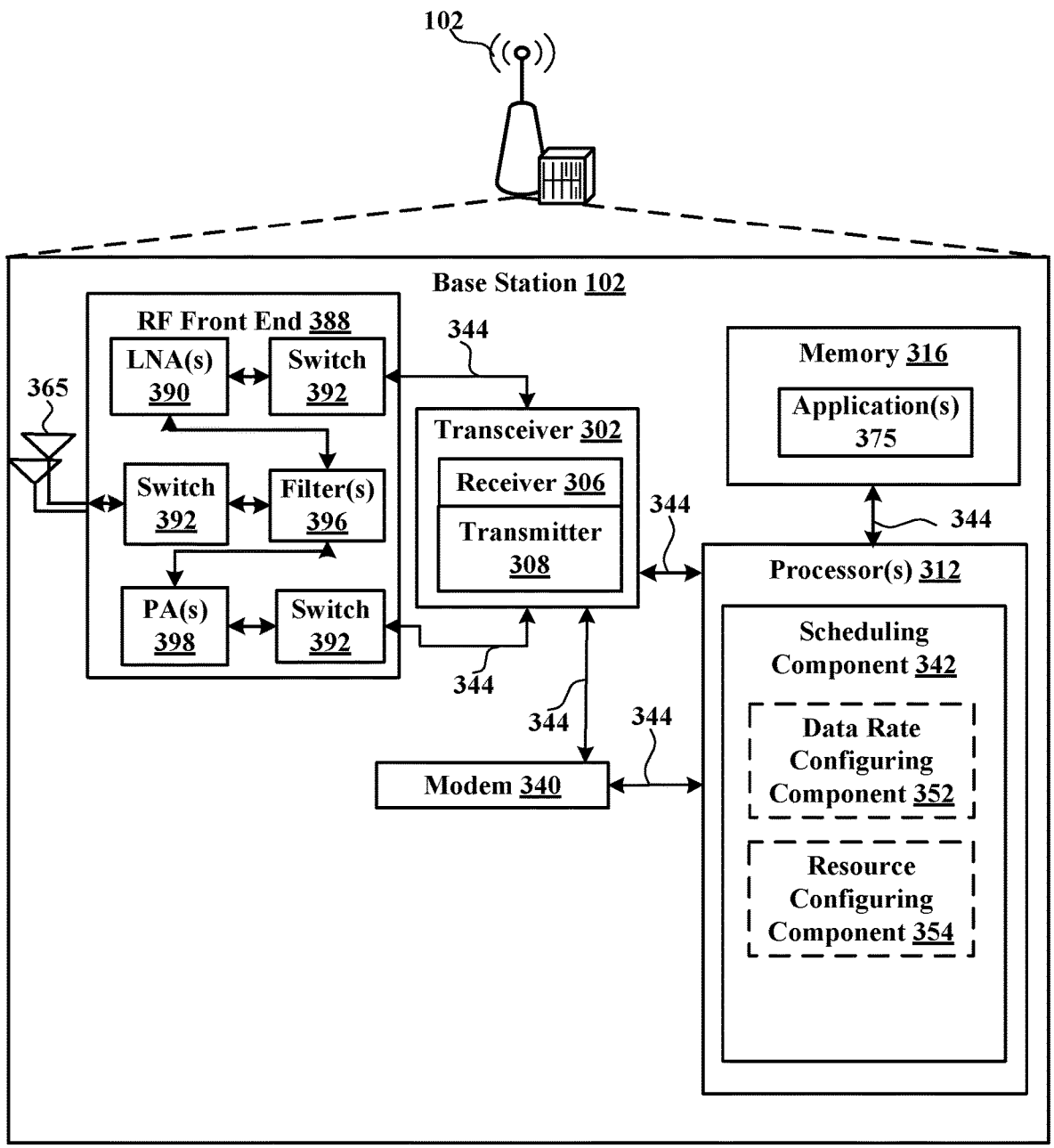
FIG. 3 is a block diagram illustrating an example of a base station, in accordance with various aspects of the present disclosure.
Figure 4:
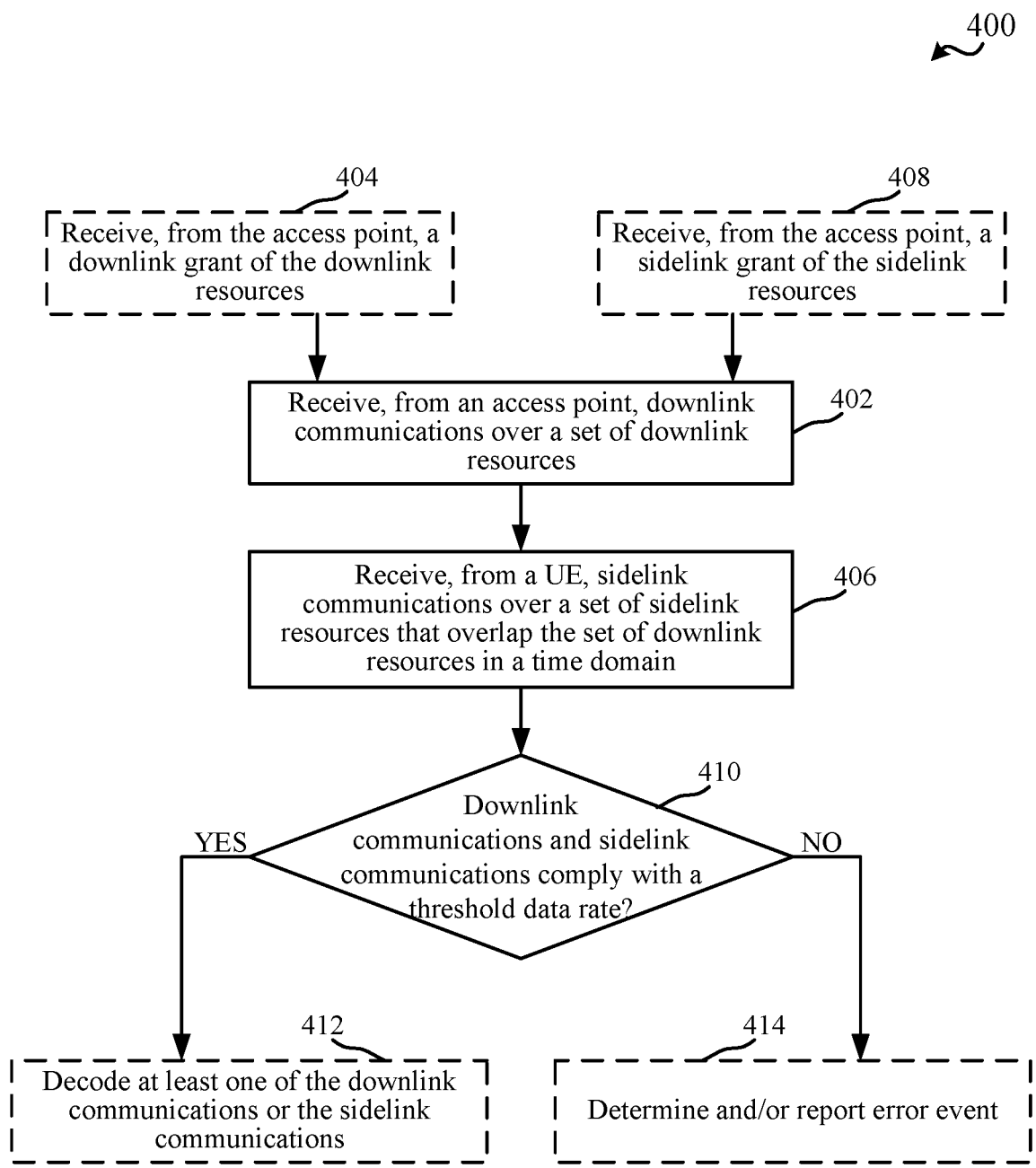
FIG. 4 is a flow chart illustrating an example of a method for determining data rates for receiving communications over multiple interfaces, in accordance with various aspects of the present disclosure.
Figure 5:
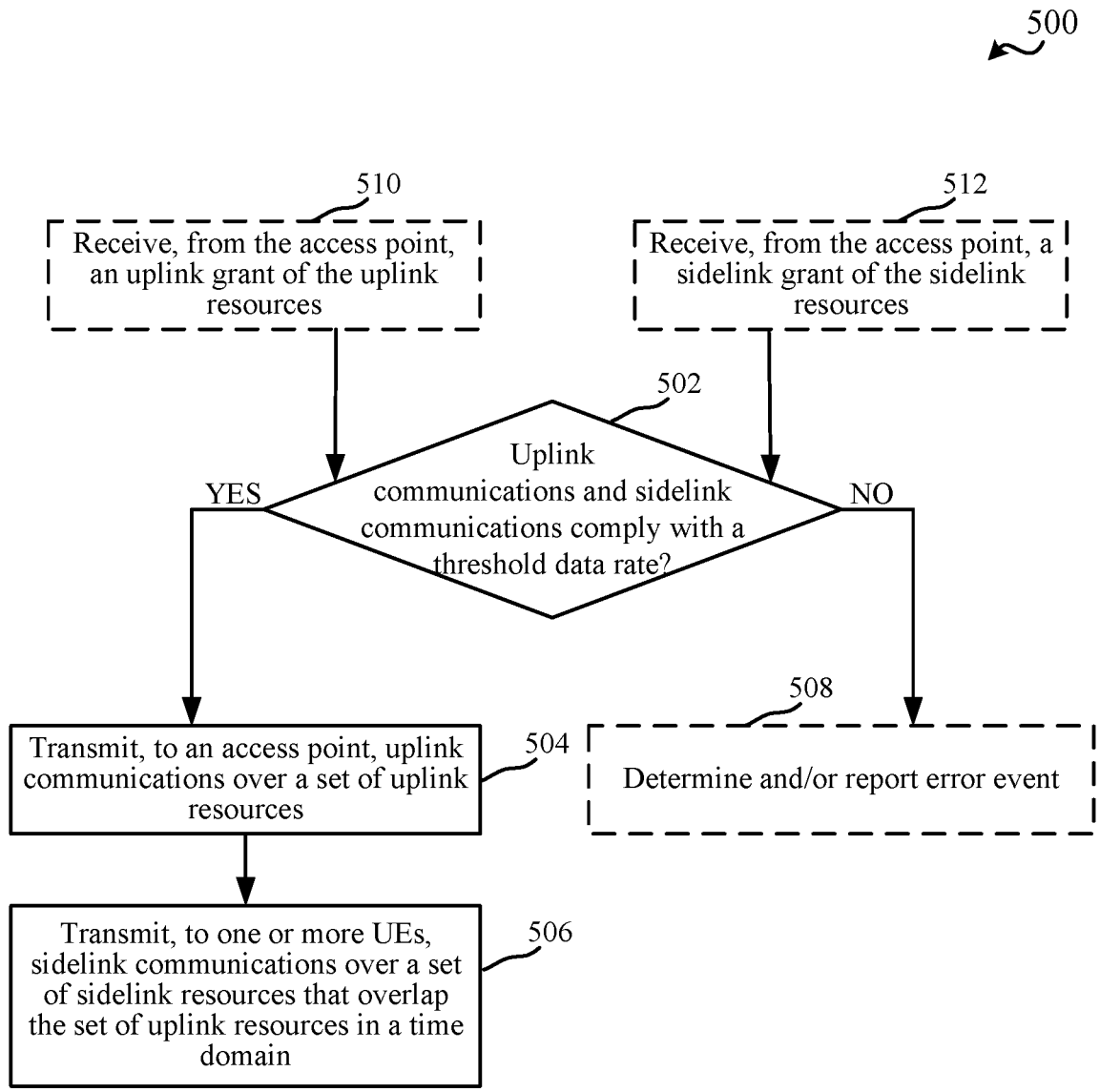
FIG. 5 is a flow chart illustrating an example of a method for determining data rates for transmitting communications over multiple interfaces, in accordance with various aspects of the present disclosure.
Figure 6:
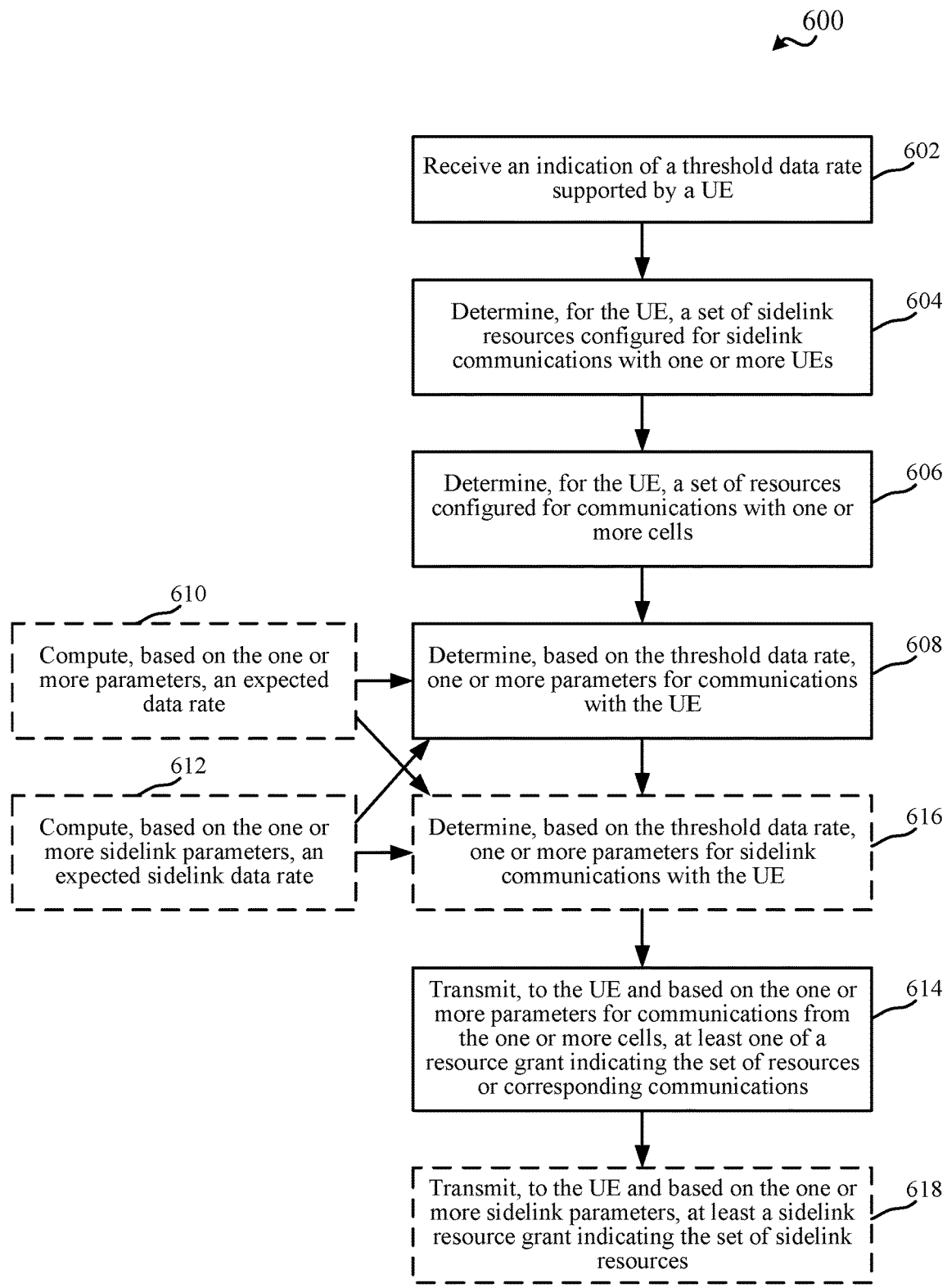
FIG. 6 is a flow chart illustrating an example of a method for considering data rates of multiple interfaces in scheduling resources, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining whether communications comply with a threshold data rate, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a data rate determining component 252 for determining a data rate of communications received over one or more interfaces, and a decoding component 254 for decoding the communications based on determining whether the data rate complies with a threshold data rate configured for the UE 104, as described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for configuring communications for a UE 104 over one or more interfaces, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as, or similar to, the corresponding components of UE 104, as described above, but configured or otherwise programmed for base station operations as opposed to UE operations.

In an aspect, scheduling component 342 can optionally include a data rate configuring component 352 for configuring a data rate or related parameters for communications to be transmitted to a UE, and/or a resource configuring component 354 for configuring communication resources for the UE over one or more interfaces (e.g., uplink/downlink resources over a Uu interface, sidelink resources over a sidelink interface, etc.).

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for determining a data rate associated with communications concurrently received over multiple interfaces. In an example, a UE (e.g., UE 104-*a*) can perform the functions described in method 400 using one or more of the components described in FIGS. 1 and 2.

In method 400, at Block 402, downlink communications can be received from an access point over a set of downlink resources. In an aspect, communicating component 242, e.g., in conjunction with processor(s) 212, memory 216, transceiver 202, etc., can receive, from the access point (e.g., base station 102, which may be a gNB), the downlink communications over the set of downlink resources. For example, the downlink communications can include communications received over a PDSCH, physical downlink control channel (PDCCH), or other downlink channels. The downlink communications can be received according to a modulation and coding scheme (MCS), transport block size (TBS), etc., which can yield a data rate for the downlink communications (e.g. based on the formulas described above). Moreover, for example, communicating component 242 can receive the downlink communications from the access point in a corresponding cell, and/or from one or more other access points and/or other cells of the access point. In addition, for example, communicating component 242 can receive the downlink communications over one or more CCs, BWPs, and/or the like.

In one example, in method 400, optionally at Block 404, a downlink grant of the downlink resources can be received from the access point. In an aspect, communicating component 242, e.g., in conjunction with processor(s) 212, memory 216, transceiver 202, etc., can receive, from the access point, the downlink grant of the downlink resources. For example, communicating component 242 can receive the downlink grant over a control channel with the access point (e.g., PDCCH). In other examples, the UE 104 may receive a downlink grant of the downlink resources from one or more other access points and/or cells.

In method 400, at Block 406, sidelink communications can be received from a UE over a set of sidelink resources that overlap the set of downlink resources in a time domain. In an aspect, communicating component 242, e.g., in conjunction with processor(s) 212, memory 216, transceiver 202, etc., can receive, from the UE, sidelink communications over the set of sidelink resources that overlap the set of downlink resources in the time domain. In this example, communicating component 242 can concurrently receive the downlink and sidelink communications. For example, the sidelink communications can include communications received over a PSSCH, PSCCH, or other sidelink channels. The sidelink communications can be received according to a MCS, TBS, etc., which can yield a data rate for the sidelink communications (e.g., based on the formulas described above). Moreover, for example, communicating component 242 can receive the sidelink communications over one or more CCs, BWPs, and/or the like.

Moreover, though aspects are generally described herein in terms of downlink and sidelink communications (e.g., Uu and sidelink interfaces), the concepts can be similarly applied to other types of interfaces over which communications are concurrently received by a UE and/or potentially subject to data rate constraints for decoding.

In one example, in method 400, optionally at Block 408, a sidelink grant of the sidelink resources can be received from the access point. In an aspect, communicating component 242, e.g., in conjunction with processor(s) 212, memory 216, transceiver 202, etc., can receive, from the access point, the sidelink grant of the sidelink resources. For example, communicating component 242 can receive the sidelink grant over a control channel with the access point (e.g., PDCCH). This can be part of resource allocation mode 1, described above, where the base station 102 can configure sidelink communication resources for the UE 104 to use in communicating with other UEs, where the configured resources can be precise and/or can be a collection of resources from which the UE (and/or other UEs) can choose for sidelink communications. In other examples, as described (e.g., in resource allocation 2), the UE 104 can determine the sidelink resources (e.g., without a grant) based on sensing, measuring, reserving, etc. the resources using listen-before-talk or other clear channel assessment strategies.

In method 400, at Block 410, it can be determined whether downlink communications and sidelink communications comply with a threshold data rate. In an aspect, data rate determining component 252, e.g., in conjunction with processor(s) 212, memory 216, transceiver 202, communicating component 242, etc., can determine whether downlink communications and sidelink communications comply with the threshold data rate. For example, data rate determining component 252 can determine the threshold data rate configured at or by the UE 104, as described above, and can determine whether the data rates for the downlink communications and sidelink communications (e.g., whether the data rates for the communications when considered together for concurrently received communications) are less than or equal to the threshold data rate. For example, data rate determining component 252 can determine a total data rate by adding the computed data rate for downlink communications with the data rate for sidelink communications that are concurrently received with one another, and can compare the total data rate to the threshold data rate. Moreover, the downlink communications may include downlink communications received over one or more CCs or BWPs, from one or more cells of the same or different gNB, from one or more same or different operator/PLMNs, etc., and the sidelink communications may include sidelink communications received from one or more UEs over one or more CCs or BWPs, relating to a same or different operator/PLMNs, etc.

Where the downlink communications and sidelink communication comply with the data rate at Block 410, at Block 412, at least one of the downlink communications or the sidelink communications can be decoded. In an aspect, decoding component 254, e.g., in conjunction with processor(s) 212, memory 216, transceiver 202, communicating component 242, etc., can decode at least one of the downlink communications or the sidelink communications, or a combination thereof. Where the downlink communications and sidelink communication do not comply with the data rate at Block 410, optionally at Block 414, an error event can be determined and/or reported. In an aspect, decoding component 254, e.g., in conjunction with processor(s) 212, memory 216, transceiver 202, communicating component 242, etc., can determine and/or report the error event. For example, decoding component 254 can report the error event to an interface (e.g., the Uu or sidelink interface), to a transmitting entity (e.g., the base station for downlink communications or other UE for sidelink communications), and/or the like.

FIG. 5 illustrates a flow chart of an example of a method 500 for determining a data rate associated with communications concurrently transmitted over multiple interfaces. In an example, a UE (e.g., UE 104-a) can perform the functions described in method 400 using one or more of the components described in FIGS. 1 and 2.

In method 500, at Block 502, it can be determined whether uplink communications and sidelink communications comply with a threshold data rate. In an aspect, data rate determining component 252, e.g., in conjunction with processor(s) 212, memory 216, transceiver 202, communicating component 242, etc., can determine whether uplink communications and sidelink communications comply with the threshold data rate. For example, data rate determining component 252 can determine the threshold data rate configured at or by the UE 104, as described above, and can determine whether the data rates for the uplink communications and sidelink communications (e.g., whether the data rates for the communications when considered together—e.g., summed—for concurrently transmitted communications) are less than or equal to the threshold data rate.

For example, data rate determining component 252 can determine a total data rate by adding the computed data rate for uplink communications with the data rate for sidelink communications that are concurrently transmitted with one another (or scheduled for concurrent transmission with one another, such as in overlapping time periods). In this example, data rate determining component 252 can compare the total data rate to the threshold data rate. For example, data rate determining component 252 can determine the data rate for uplink communications based on one or more parameters for transmitting the uplink communications, which may have been configured by the base station 102, as described above. For example, data rate determining component 252 can determine the data rate for sidelink communications based on one or more parameters for transmitting the sidelink communications, which may have been configured by the base station 102, by the UE 104, by one or more other UEs 104, etc. as described above. Moreover, the uplink communications may include uplink communications that are scheduled for transmission over one or more CCs or BWPs, to one or more cells of the same or different gNB, to one or more same or different operator/PLMNs, etc., and the sidelink communications may include sidelink communications transmitted to one or more UEs over one or more CCs or BWPs, relating to a same or different operator/PLMNs, etc.

Where the uplink communications and sidelink communication comply with the data rate at Block 502, at Block 504, uplink communications can be transmitted, to an access point, over a set of uplink resources. In an aspect, communicating component 242, e.g., in conjunction with processor(s) 212, memory 216, transceiver 202, etc., can transmit, to the access point (e.g., base station 102), uplink communications over the set of uplink resources. For example, communicating component 242 can transmit the uplink communications using parameters used to determine the data rate (e.g., and over the Uu interface), as described above. For example, this may include determining to encode the uplink communications for transmission over scheduled resources as well. In addition, where the uplink communications and sidelink communication comply with the data rate at Block 502, at Block 506, sidelink communications can be transmitted, to one or more UEs, over a set of sidelink resources. In an aspect, communicating component 242, e.g., in conjunction with processor(s) 212, memory 216, transceiver 202, etc., can transmit, to the one or more UEs, sidelink communications over the set of sidelink resources (e.g., and over the sidelink interface). For example, communicating component 242 can transmit the sidelink communications using parameters used to determine the sidelink data rate, as described above. For example, this may include determining to encode the sidelink communications for transmission over scheduled resources as well.

Where the uplink communications and sidelink communication do not comply with the data rate at Block 502, optionally at Block 508, an error event can be determined and/or reported. In an aspect, communicating component 242, e.g., in conjunction with processor(s) 212, memory 216, transceiver 202, etc., can determine and/or report the error event. For example, communicating component 242 can report the error event to an interface (e.g., the Uu or sidelink interface), to a receiving entity (e.g., the base station for uplink communications or other UE for sidelink communications), and/or the like.

In an example, optionally at Block 510, an uplink grant of the uplink resources can be received from the access point. In an aspect, communicating component 242, e.g., in conjunction with processor(s) 212, memory 216, transceiver 202, etc., can receive, from the access point (e.g., base station 102, which may be a gNB), the uplink grant of the uplink resources. For example, the uplink grant may include uplink resources for transmissions over a PUCCH, PUSCH, etc. In addition, in an example, the uplink grant may include or may otherwise indicate or be related to one or more other parameters for transmitting the uplink communications, such as a MCS, TBS, etc., which can yield a data rate for the uplink communications (e.g., based on the formulas described above). Moreover, for example, communicating component 242 can transmit the uplink communications to the access point in a corresponding cell, and/or to one or more other access points and/or other cells of the access point. In addition, for example, communicating component 242 can transmit the uplink communications over one or more CCs, BWPs, and/or the like.

In one example, in method 512, optionally at Block 512, a sidelink grant of the sidelink resources can be received from the access point. In an aspect, communicating component 242, e.g., in conjunction with processor(s) 212, memory 216, transceiver 202, etc., can receive, from the access point, the sidelink grant of the sidelink resources. For example, communicating component 242 can receive the sidelink grant over a control channel with the access point (e.g., PDCCH). This can be part of resource allocation mode 1, described above, where the base station 102 can configure sidelink communication resources for the UE 104 to use in communicating with other UEs, where the configured resources can be precise and/or can be a collection of resources from which the UE (and/or other UEs) can choose for sidelink communications. In other examples, as described (e.g., in resource allocation 2), the UE 104 can determine the sidelink resources (e.g., without a grant) based on sensing, measuring, reserving, etc. the resources using listen-before-talk or other clear channel assessment strategies.

FIG. 6 illustrates a flow chart of an example of a method 600 for scheduling resources and/or communications based on determining a data rate associated with multiple interfaces. In an example, an access point (e.g., base station 102, which may be a gNB) can perform the functions described in method 600 using one or more of the components described in FIGS. 1 and 3. For example, when a UE 104 is concurrently using multiple interfaces (e.g., Uu and sidelink), the access point can take steps or actions in an attempt to ensure the threshold data rate at the UE 104 (also referred to as the maximum data rate) is not violated.

In method 600, at Block 602, an indication of a threshold data rate supported by a UE can be received. In an aspect, data rate configuring component 352, e.g., in conjunction with processor(s) 312, memory 316, transceiver 302, scheduling component 342, etc., can receive the indication of the threshold data rate supported by the UE (e.g., UE 104). For example, the UE 104 can configure the threshold data rate and can provide the value to the base station 102. In another example, UE 104 can configure a threshold data rate for the UE 104 based on one or more other parameters of the UE 104 (e.g., UE class, quality-of-service (QoS) requirements, and/or the like). Moreover, in an example, data rate configuring component 352 can receive one or more parameters configured for or by the UE 104 that can be used to compute the threshold data rate. As described, the threshold data rate can relate to a maximum data rate at which the UE 104 can receive communications (e.g., concurrently over multiple interfaces) for decoding, where the UE may refrain from decoding communications received that exceed the threshold data rate. In another example, the threshold data rate can relate to a maximum data rate at which the UE 104 can transmit communications (e.g., concurrently over multiple interfaces), where the UE may refrain from transmitting and/or encoding communications that exceed the threshold data rate.

In method 600, at Block 604, a set of sidelink resources configured for sidelink communications with one or more other UEs can be determined for the UE. In an aspect, data rate configuring component 352, e.g., in conjunction with processor(s) 312, memory 316, transceiver 302, scheduling component 342, etc., can determine, for the UE (e.g., UE 104), the set of sidelink resources configured for sidelink communications with one or more other UEs. For example, the scheduling component 342 may have configured the set of sidelink resources, and data rate configuring component 352 can accordingly determine the set of sidelink resources it configured. In other examples, data rate configuring component 352 may not know sidelink resources used by the UE 104 (e.g., where the UE 104 determines the resources, such as in resource allocation mode 2 and/or where the resources corresponding to another operator/PLMN, etc.). Moreover, as described, the set of sidelink resources may correspond to one or more CCs, BWPs, operator/PLMNs, etc. The sidelink resources can correspond to resources used by the UE 104 in transmitting sidelink communications to one or more other UEs and/or resources used by the UE 104 in receiving sidelink communications from one or more other UEs.

In method 600, at Block 606, a set of resources configured for communications with one or more cells can be determined for the UE. In an aspect, data rate configuring component 352, e.g., in conjunction with processor(s) 312, memory 316, transceiver 302, scheduling component 342, etc., can determine, for the UE (e.g., UE 104), the set of resources configured for communications with one or more cells (e.g., cells of base station 102 or other cells). In one example, scheduling component 342 can allocate the downlink resources for the UE 104, and data rate configuring component 352 can accordingly determine the set of downlink resources. In another example, data rate configuring component 352 can determine downlink resources allocated to the UE 104 by other cells (e.g., other cells of the base station 102 or from other base stations in the same or different operator/PLMN, etc.). Similarly, in one example, scheduling component 342 can allocate the uplink resources for the UE 104, and data rate configuring component 352 can accordingly determine the set of uplink resources. In another example, data rate configuring component 352 can determine uplink resources allocated to the UE 104 by other cells (e.g., other cells of the base station 102 or from other base stations in the same or different operator/PLMN, etc.). Moreover, as described, the set of resources may correspond to one or more CCs, BWPs, operator/PLMNs, etc.

In method 600, at Block 608, one or more parameters for communications with the UE can be determined based on the threshold data rate. In an aspect, data rate configuring component 352, e.g., in conjunction with processor(s) 312, memory 316, transceiver 302, scheduling component 342, etc., can determine, based on the threshold data rate, the one or more parameters for communications with the UE (e.g., UE 104). For example, data rate configuring component 352 can determine one or more downlink parameters as, or including, a data rate to use in transmitting the downlink communications to the UE 104, which can be based on the threshold data rate and/or on the determined set of downlink resources, sidelink resources and/or other parameters. In another example, data rate configuring component 352 can determine the one or more downlink parameters as, or including, parameters for computing or estimating the data rate for transmitting downlink communications to the UE, such as a number of configured serving cells belonging to a frequency range, a number of TB(s) transmitted in a slot, a numerology for PDSCH, a number of bits in the transport block, a number of code blocks or scheduled code blocks for the transport block, etc., as described above.

In another example, data rate configuring component 352 can determine one or more uplink parameters as, or including, a data rate to use in scheduling the UE 104 for transmitting uplink communications, which can be based on the threshold data rate and/or on the determined set of uplink resources, sidelink resources and/or other parameters. In another example, data rate configuring component 352 can determine the one or more uplink parameters as, or including, parameters for computing or estimating the data rate for uplink communications at the UE, such as a number of configured serving cells belonging to a frequency range, a number of TB(s) transmitted in a slot, a numerology for PDSCH, a number of bits in the transport block, a number of code blocks or scheduled code blocks for the transport block, etc., as described above.

For example, in method 600, optionally at Block 610, an expected data rate can be computed based on the one or more parameters. In an aspect, data rate configuring component 352, e.g., in conjunction with processor(s) 312, memory 316, transceiver 302, scheduling component 342, etc., can compute, based on the one or more parameters, the expected data rate, which can be for an interface, such as the Uu interface. For example, data rate configuring component 352 can compute the expected data rate based also on the set of sidelink resources where the sidelink resources at least partially overlap in time with the set of resources, as described further herein (e.g., where sidelink resources for receiving communications overlap the set of downlink resources or where sidelink resources for transmitting communications overlap the set of uplink resources). In addition, in an example, data rate configuring component 352 can determine the one or more parameters based on the expected data rate (e.g., downlink parameters based on expected downlink data rate and/or uplink parameters based on expected uplink data rate).

For example, in method 600, optionally at Block 612, an expected sidelink data rate can be computed based on the one or more sidelink parameters. In an aspect, data rate configuring component 352, e.g., in conjunction with processor(s) 312, memory 316, transceiver 302, scheduling component 342, etc., can compute, based on the one or more sidelink parameters, the expected sidelink data rate. In addition, in an example, data rate configuring component 352 can determine the one or more parameters (e.g., one or more downlink parameters for concurrent UE reception or one or more uplink parameters for concurrent UE transmission) based on the expected sidelink data rate, as described further herein.

In method 600, at Block 614, at least one of a resource grant indicating the set of resources or corresponding communications can be transmitted to the UE and based on the one or more parameters. In an aspect, resource configuring component 354, e.g., in conjunction with processor(s) 312, memory 316, transceiver 302, scheduling component 342, etc., can transmit, to the UE and based on the one or more parameters, at least one of a resource grant indicating the set of resources or corresponding communications. For example, resource configuring component 354 can configure and transmit the resource grant or communications based on the expected data rate and/or the expected sidelink data rate in an attempt to comply with threshold data rate at the UE 104, as described in various scenarios/examples herein. In one example, this can include resource configuring component 354 configuring and/or transmitting the downlink resource grant or downlink communications based on the expected downlink data rate and/or the expected sidelink data rate in an attempt to comply with threshold data rate at the UE 104 receiving the downlink communications and the sidelink communications. In another example, this can include resource configuring component 354 configuring and/or transmitting the uplink resource grant or uplink communications based on the expected uplink data rate and/or the expected sidelink data rate in an attempt to comply with threshold data rate at the UE 104 transmitting the uplink communications and the sidelink communications.

Similarly, in one example, such as in resource allocation scheme 1 where the base station 102 schedules sidelink resources for the UE, in method 600, optionally at Block 616, one or more sidelink parameters for sidelink communications to the UE can be determined based on the threshold data rate. In an aspect, data rate configuring component 352, e.g., in conjunction with processor(s) 312, memory 316, transceiver 302, scheduling component 342, etc., can determine, based on the threshold data rate, the one or more sidelink parameters for the sidelink communications to the UE (e.g., UE 104). For example, data rate configuring component 352 can determine the one or more sidelink parameters as, or including, a data rate to use in receiving (and/or for other UEs to use in transmitting) the sidelink communications, which can be based on the threshold data rate and/or on the determined set of downlink resources, sidelink resources and/or other parameters.

In this example, in method 600, optionally at Block 618, at least a sidelink resource grant indicating the set of sidelink resources can be transmitted to the UE (and/or other UEs) and based on the one or more sidelink parameters. In an aspect, resource configuring component 354, e.g., in conjunction with processor(s) 312, memory 316, transceiver 302, scheduling component 342, etc., can transmit, to the UE (and/or other UEs) and based on the one or more sidelink parameters, at least the sidelink resource grant indicating the set of sidelink resources. For example, resource configuring component 354 can configure and transmit the sidelink resource grant based on the expected downlink data rate and/or the expected sidelink data rate in an attempt to comply with threshold data rate at the UE 104, as described in various scenarios/examples herein.

Though described in terms of downlink communications over the Uu interface and receiving sidelink communications, the functions described herein may also be similarly applied to transmitting uplink communications over the Uu interface and transmitting sidelink communications (e.g., concurrently), for determining a data rate for concurrently transmitting uplink and sidelink communications, etc.

In one specific example, for enabling data sharing, various schemes can be considered. In a first scheme, data rate determining component 352 can consider a single set of parameter values per CC per band or band combination in determining a data rate for the UE and/or other downlink parameters for scheduling resources to the UE and/or transmitting downlink communications to the UE (e.g., at Block 608, 610, etc.). In one example, the UE 104 can report capability for different parameters (e.g., along with or similarly to reporting its threshold data rate at Block 602). The parameters may include number of layers, modulation order, the parameter f described above, etc. In an example, the UE 104 can report its capability to the base station 102 (e.g., if within cell coverage) or to a second UE in sidelink communications, where the second UE can report the capability on the behalf of the UE. As described herein, data rate determining component 352 can use these parameters to compute the maximum data rates, as described herein, which may be computed for each CC and may include computing a data rate based on the maximum of the parameter values for each interface or based on computing the data rate for each interface and selecting the maximum of the data rates.

For example, if different parameter values are considered and/or reported per parameter for Uu and sidelink (SL), data rate determining component 352 can compute the one or more downlink parameters (e.g., at Block 608) as, or based on, determining the threshold data rate for Uu and SL together. For example, data rate determining component 352 can calculate the total threshold data rate for Uu and SL separately based on different parameter values, and then take the maximum data rate to be used as a threshold for checking the condition. For example, this can include computing the total data rate for each interface separately using the following formula as described above:

$$\text{data rate (in } Mbps\text{)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

In another example, data rate determining component 352 can take the maximum value for each of the parameters as related to each interface and then compute the data rate to be used as the threshold for checking the condition or otherwise determining resource scheduling or other parameters for downlink and/or sidelink communications to the UE 104.

Additionally, in an example, for calculating the data rate for SL (e.g., at Block 612), if multiple resources pools for SL are configured and configured parameters for each resource pool are different, data rate determining component 352 can take the maximum value per parameter or then again calculate the maximum data rate and pick the maximum of the calculated maximum data rates as the candidate maximum data rate for the SL (e.g. for the calculation of threshold data rate above). This can be applicable to both data sharing for DL and data sharing for UL. In addition, for taking the maximum value for each of the parameters, as described above, BW may be an exception since for data rate sharing, it is set to the component carrier BW. In any case, in the first scheme, data rate determining component 352 can determine, based on the threshold data rate, one or more sidelink parameters for sidelink communications at the UE and can transmit, based on the one or more sidelink parameters, a sidelink resource grant indicating the sidelink resources.

In another example in this scheme, data rate determining component 352 can compute, based on the one or more parameters corresponding to the Uu interface (e.g., uplink or downlink parameters), the expected data rate for communications over the Uu interface (e.g., at Block 610), can compute, based on the one or more sidelink parameters, the expected sidelink data rate for the sidelink communications (e.g., at Block 612), and/or can determine the one or more Uu parameters (e.g., at Block 608) or sidelink parameters (e.g., at Block 616) based on comparing a maximum of the expected Uu data rate and the expected sidelink date rate to the threshold data rate. As described, in an example, where there are multiple sidelink resource pools, computing the expected sidelink data rate can include computing a data rate for each resource pool and taking the maximum. In another example in this scheme, data rate determining component 352 can compute, based on determining maximum values for each of the one or more Uu parameters or the one or more sidelink parameters, an expected maximum data rate for the Uu communications, and/or can determine the one or more Uu parameters or sidelink parameters based on comparing the maximum expected Uu data rate to the threshold data rate. Similarly, in this example, for multiple sidelink resource pools, the expected sidelink data rate can be the maximum of data rates computed for each pool.

In a second scheme, data rate determining component 352 can consider separate sets of data rate parameters for Uu and SL per component carrier per band or band combination. In this case, data rate determining component 352 can compute and check the threshold data rate (e.g., as the Uu parameters or sidelink parameters described above) separately between the Uu carriers and SL carriers. Even if on one CC, both SL and Uu are supported, data rate determining component 352 can consider the interfaces as two carriers (or virtual carriers) for the purpose of data rate calculation (e.g., at Block 610 and/or 612). For example, given CC1 with Uu only, CC2 with Uu and SL and CC3 with SL only, data rate determining component 352 can compute threshold data rate for Uu on CC1 and CC2 and threshold data rate for SL on CC2 and CC3. Scheduling component 342 can schedule Uu DL/UL on CC1 and CC2 such that the data rate condition for Uu DL/UL is satisfied (e.g., based on transmitting the resource grant at Block 614). Similarly, where scheduling component 342 schedules sidelink resources, scheduling component 342 can schedule SL Tx/RX on CC2 and CC3 such that the data rate condition for SL Tx/Rx is satisfied (e.g., based on transmitting the resource grant at Block 618).

In any case, in the second scheme, data rate determining component 352 can determine, based on the threshold data rate, one or more sidelink parameters for sidelink communications at the UE and can transmit, based on the one or more sidelink parameters, a sidelink resource grant indicating the sidelink resources.

In another example in this scheme, data rate determining component 352 can compute, based on the one or more Uu parameters, the expected Uu data rate for communications on the Uu interface (e.g., uplink or downlink communications, at Block 610), can compute, based on the one or more sidelink parameters, the expected sidelink data rate for the sidelink communications (e.g., at Block 612), can determine the one or more Uu parameters based on comparing the expected Uu data rate to threshold data rate (e.g., at Block 608), and/or can determine sidelink parameters based on comparing the expected sidelink data rate to the threshold data rate (e.g., at Block 616).

In an example, the first and second schemes described above may be used in various scenarios of combinations of operator/PLMN, cell/gNB, CC, BWP, etc. per interface. Accordingly, for example, the data rate determining component 352 may determine which scenario applies in further determining the data rate, as described herein below.

As described, in a first scenario, the interfaces may correspond to the same operator/PLMN and the same cell/gNB. In this example, assuming resource allocation mode 1 (where the gNB schedules both Uu and sidelink resources), and (2) timing capability 1 for both Uu and SL, then data sharing across a SL carrier and a Uu carrier can be allowed, and may be based on the first scheme described above. For example, under resource allocation mode 1, the transmission/reception is under the control of the same gNB, hence, the gNB can ensure that the data rate condition is not violated. The timing capability condition can be satisfied in DL for data rate sharing in the DL/reception and UL for data rate sharing in the UL/transmission. For DL/reception part, for example, the UE receives PDSCH on Uu and can report HARQ-ACK on PUCCH. The N1 gap can be based on minimum processing timing capability 1. The UE can also receive a PSSCH on the SL from another UE, and may transmit HARQ-ACK on physical sidelink feedback channel (PSFCH) back to the other UE. The gap between the end of PSSCH and the beginning of the PSFCH can also be based on timing capability 1. For UL/transmission part, the UE can receive an UL grant from the gNB and can send a PUSCH. The N2 gap can be based on the minimum processing timing capability 1. The UE can also receive a downlink control information (DCI) from the gNB, which schedules PSCCH/PSSCH transmission on the sidelink to another UE. The gap between the end of the PDCCH carrying this DCI and the beginning of the PSCCH/PSSCH can also be based on timing capability 1.

For the other option, when data rate computation and comparison is done separately for Uu and SL, the data rate sharing can be done for SL only over CCs/BWP/resource pools configured with timing capability #1.

In an example of scenario 1 above, SL and Uu may be on the same component carrier. In this example, for reception, the SL receiving UE may receive PDSCH on the Uu BWP and PSSCH on the SL BWP. The two might be overlapping, and the UE might be able to decode both (e.g., as long as the data sharing condition across the aggregated component carriers is satisfied, there is no issue). If the UE is not capable of processing two overlapping (unicast) PDSCHs/PSSCHs, then one may not be processed. In this case too, if the data rate sharing condition across the aggregated component carriers is satisfied, there may be no issue.

If one component carrier is configured with timing capability 2, and if the UE is supporting both Uu and SL simultaneously on the same component carrier, both Uu and SL operations can be based on timing capability 2. In this case, the maximum data-rate for the same carrier can be satisfied regardless of whether the UE can process overlapping Uu and SL channels or drops one, i.e., this carrier cannot be used for data sharing. In another case, in this example, given that the BWP for Uu and SL are configured independently, their timing capabilities may also be independently configured. For example, the Uu Tx/Rx may be based on capability 2, while the SL operation may be based on capability 1. In this case, data rate determining component 352 can separately compute and check data rates for each interface, as described above.

In another example, under resource allocation mode 2 (e.g., where the sidelink UEs determine resources based on sensing, measurement, and reservation of resources, the gNB may not know when the transmitting UE transmits sidelink communications. Hence, in an attempt to make sure error event does not happen, due to violating the maximum data rate condition, the gNB can be conservative in its allocation over Uu when overlapping with potential SL Rx resources. Accordingly, the data rate determining component 352 can separately compute and check data rates for each interface (e.g., where sidelink data rate can be calculated based on UE capability information that can be provided to the base station 102, as described above). In another example, Uu and SL resources may be fully time division multiplexed (e.g., not overlapping in the time domain), in which case single parameter(s) and/or corresponding data rate(s) per component carrier or band combination can be considered, as described above.

In scenario 2 described above, where the same operator/PLMN and different cells/gNBs for Uu and SL are used, even if resource allocation mode 1 is used, the gNBs may not be aware of each other's resource allocation. Hence, data rate determining component 352 can separately compute and check data rates for each interface, as described above. In another example, in scenario 2, Uu and SL resources may be fully time division multiplexed (e.g., not overlapping in the time domain), in which case single parameter(s) and/or corresponding data rate(s) per component carrier or band combination can be considered, as described above (e.g., and/or based on the data rate determining component 352 determining that the resources are full time division multiplexed).

In scenario 3-1 described above, where there are different operators, UEi Tx is in the operator i's band, and Rx is not, data rate determining component 352 can separately compute and check data rates for each interface, as described above. In another example, in scenario 3-1, Uu PDSCH and SL (Tx or Rx) resources may be fully time division multiplexed (e.g., not overlapping in the time domain), in which case single parameter(s) and/or corresponding data rate(s) per component carrier or band combination can be considered, as described above (e.g., and/or based on the data rate determining component 352 determining that the resources are full time division multiplexed).

In scenario 3-2 described above, where SL Tx/Rx for one UE is not within the band of its operator, if the UE is a guest UE and has Uu link to its own operator's gNB, data rate determining component 352 can separately compute and check data rates for each interface, as described above. In another example, in this case, Uu PDSCH and SL Tx resources may be fully time division multiplexed (e.g., not overlapping in the time domain), in which case single parameter(s) and/or corresponding data rate(s) per component carrier or band combination can be considered, as described above (e.g., and/or based on the data rate determining component 352 determining that the resources are fully time division multiplexed). In another case, where the UE is fully roaming, this may be similar to scenario 1 above (where the different operator has the SL and Uu interface for the UE), and the conditions on whether to use a single parameter/data rate for the interfaces or to separately compute and check the parameters/data rates can be similar to those described in relation to scenario 1 above. Similarly, where the UE is fully roaming, it can be in a situation with the other operator that is similar to scenario 2 above, in which case the conditions on whether to use a single parameter/data rate for the interfaces or to separately compute and check the parameters/data rates can be similar to those described in relation to scenario 2 above.

Figure 7:
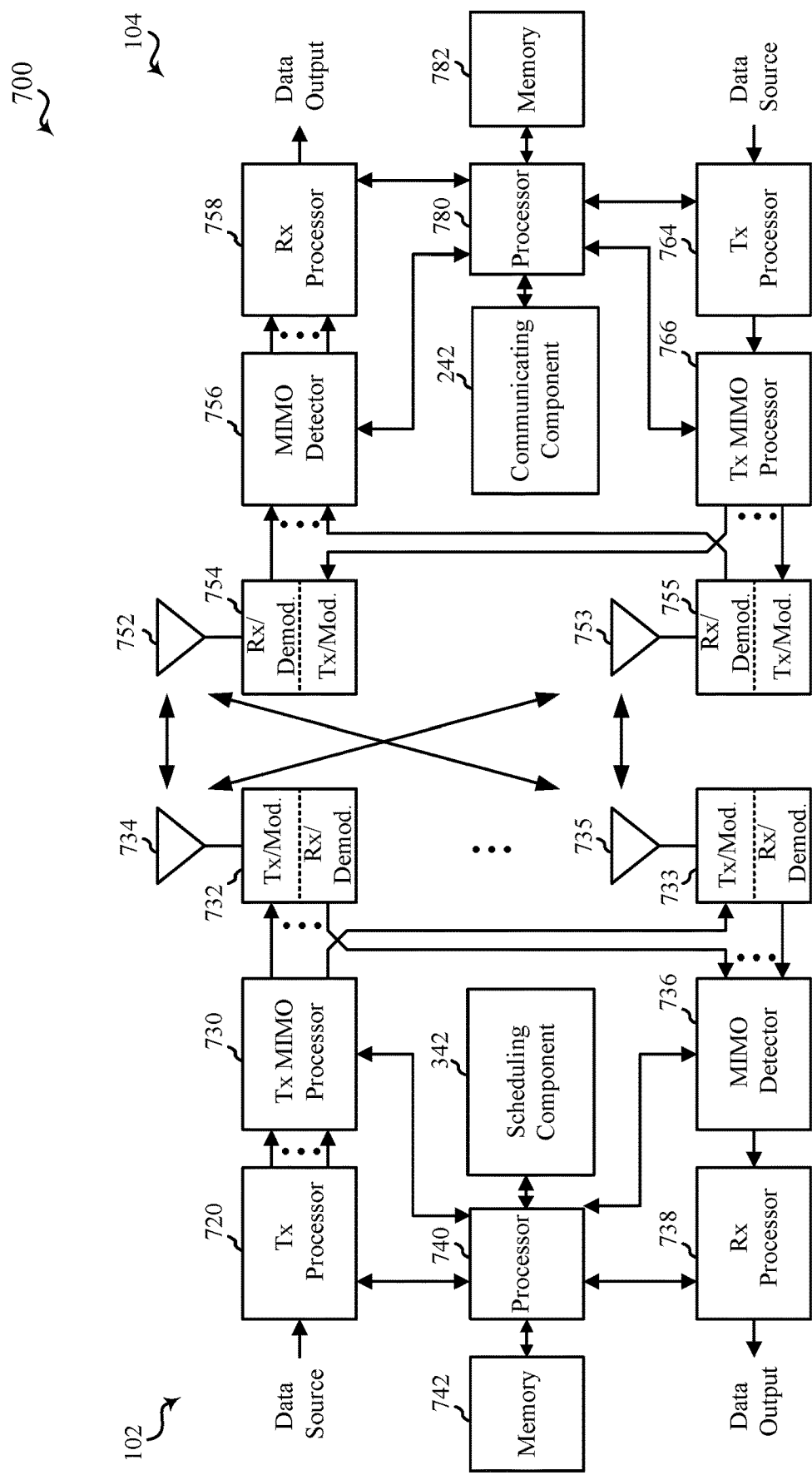
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104, in accordance with various aspects of the present disclosure. The MIMO communication system 700 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
receiving, from an access point, downlink communications over a set of downlink resources;
receiving, from a user equipment (UE), sidelink communications over a set of sidelink resources that overlap the set of downlink resources at least in a time domain;
determining, based on determining whether the downlink communications and the sidelink communications comply with a threshold data rate, whether to decode at least one of the downlink communications or the sidelink communications; and
decoding, based on determining to decode, the at least one of the downlink communications or the sidelink communications.

2. The method of claim 1, wherein the set of downlink resources correspond to a same component carrier as the set of sidelink resources.

3. The method of claim 1, wherein the set of downlink resources correspond to a different component carrier than the set of sidelink resources.

4. The method of claim 1, further comprising receiving, from the access point, a downlink grant indicating the set of downlink resources.

5. The method of claim 4, further comprising receiving, from the access point, a sidelink grant indicating the set of sidelink resources.

6. The method of claim 1, wherein determining whether the downlink communications and the sidelink communications comply with a threshold data rate comprises:
computing a total data rate for the downlink communications received from each of one or more serving cells including the access point and for the sidelink communications received from one or more transmitting sidelink UEs including the UE; and
comparing the total data rate to the threshold data rate.

7. The method of claim 1, wherein the set of downlink resources and the set of sidelink resources correspond to a same component carrier, and wherein determining whether to decode is further based on determining whether the downlink communications, the sidelink communications, and communications over a different component carrier comply with a threshold data rate.

8. The method of claim 1, wherein determining whether to decode at least one of the downlink communications or the sidelink communications comprises determining not to decode at least one of the downlink communications or the sidelink communications, and further comprising, based on determining not to decode, at least one of determining or reporting an error event.

9. A method for wireless communication, comprising:
determining, based on determining whether uplink communications and sidelink communications comply with a threshold data rate, whether to transmit at least one of the uplink communications or the sidelink communications; and
transmitting, based on determining to transmit, the at least one of the uplink communications or the sidelink communications.

10. The method of claim 9, wherein a set of uplink resources associated with the uplink communications correspond to a same component carrier as a set of sidelink resources associated with the sidelink communications.

11. The method of claim 9, wherein a set of uplink resources associated with the uplink communications correspond to a different component carrier than a set of sidelink resources associated with the sidelink communications.

12. The method of claim 9, further comprising receiving, from an access point, an uplink grant indicating a set of uplink resources for transmitting the uplink communications to the access point.

13. The method of claim 12, further comprising receiving, from the access point, a sidelink grant indicating a set of sidelink resources.

14. The method of claim 9, wherein determining whether the uplink communications and the sidelink communications comply with a threshold data rate comprises:
computing a total data rate for the uplink communications scheduled to be transmitted to each of one or more serving cells and the sidelink communications scheduled to be transmitted to each of one or more sidelink UEs; and
comparing the total data rate to the threshold data rate.

15. The method of claim 9, wherein the uplink communications and the sidelink communications correspond to a same component carrier, and wherein determining whether to transmit is based on determining whether the uplink communications, the sidelink communications, and communications over a different component carrier comply with a threshold data rate.

16. The method of claim 9, wherein determining whether to transmit at least one of the uplink communications or the sidelink communications comprises determining not to transmit at least one of the uplink communications or the sidelink communications, and further comprising, based on determining not to transmit, at least one of determining or reporting an error event.

17. An apparatus for wireless communication, comprising:
a transceiver;
a memory configured to store instructions; and
one or more processors communicatively coupled with the transceiver and the memory, wherein the one or more processors are configured to:
receive, from an access point, downlink communications over a set of downlink resources;
receive, from a user equipment (UE), sidelink communications over a set of sidelink resources that overlap the set of downlink resources at least in a time domain;
determine, based on determining whether the downlink communications and the sidelink communications comply with a threshold data rate, whether to decode at least one of the downlink communications or the sidelink communications; and
decode, based on determining to decode, the at least one of the downlink communications or the sidelink communications.

18. The apparatus of claim 17, wherein the set of downlink resources correspond to a same component carrier as the set of sidelink resources.

19. The apparatus of claim 17, wherein the set of downlink resources correspond to a different component carrier than the set of sidelink resources.

20. The apparatus of claim 17, wherein the one or more processors are further configured to receive, from the access point, a downlink grant indicating the set of downlink resources and a sidelink grant indicating the set of sidelink resources.

21. The apparatus of claim 17, wherein the one or more processors are configured to determine whether the downlink communications and the sidelink communications comply with a threshold data rate at least in part by:
   computing a total data rate for the downlink communications received from each of one or more serving cells including the access point and for the sidelink communications received from one or more transmitting sidelink UEs including the UE; and
   comparing the total data rate to the threshold data rate.

22. The apparatus of claim 17, wherein the set of downlink resources and the set of sidelink resources correspond to a same component carrier, and wherein the one or more processors are configured to determine whether to decode further based on determining whether the downlink communications, the sidelink communications, and communications over a different component carrier comply with a threshold data rate.

23. The apparatus of claim 17, wherein where the one or more processors determine not to decode at least one of the downlink communications or the sidelink communications, the one or more processors are further configured to, based on determining not to decode, at least one of determine or report an error event.

24. An apparatus for wireless communication, comprising:
   a transceiver;
   a memory configured to store instructions; and
   one or more processors communicatively coupled with the transceiver and the memory, wherein the one or more processors are configured to:
      determine, based on determining whether uplink communications and sidelink communications comply with a threshold data rate, whether to transmit at least one of the uplink communications or the sidelink communications; and
      transmit, based on determining to transmit, the at least one of the uplink communications or the sidelink communications.

25. The apparatus of claim 24, wherein a set of uplink resources associated with the uplink communications correspond to a same component carrier as a set of sidelink resources associated with the sidelink communications.

26. The apparatus of claim 24, wherein a set of uplink resources associated with the uplink communications correspond to a different component carrier than a set of sidelink resources associated with the sidelink communications.

27. The apparatus of claim 24, wherein the one or more processors are further configured to receive, from an access point, an uplink grant indicating a set of uplink resources for transmitting the uplink communications to the access point and a sidelink grant indicating a set of sidelink resources.

28. The apparatus of claim 24, wherein the one or more processors are configured to determine whether the uplink communications and the sidelink communications comply with a threshold data rate at least in part by:
   computing a total data rate for the uplink communications scheduled to be transmitted to each of one or more serving cells and the sidelink communications scheduled to be transmitted to each of one or more sidelink UEs; and
   comparing the total data rate to the threshold data rate.

29. The apparatus of claim 24, wherein the uplink communications and the sidelink communications correspond to a same component carrier, and wherein the one or more processors are configured to determine whether to transmit based on determining whether the uplink communications, the sidelink communications, and communications over a different component carrier comply with a threshold data rate.

30. The apparatus of claim 24, wherein where the one or more processors determine not to transmit at least one of the uplink communications or the sidelink communications, the one or more processors are further configured to, based on determining not to transmit, at least one of determine or report an error event.

* * * * *